United States Patent
Tobella (10) Patent No.: US 10,917,258 B2
(45) Date of Patent: Feb. 9, 2021

(54) SYSTEM, METHOD, AND CONTROLLER FOR MONITORING AND CONTROLLING A THERMAL DEVICE WITH MOBILE COMMUNICATION DEVICE

(71) Applicant: British Gas Trading Limited, Windsor (GB)

(72) Inventor: Andreu Tobella, Windsor (GB)

(73) Assignee: BRITISH GAS TRADING LIMITED, Windsor (GB)

( * ) Notice: Subject to any disclaimer, the term of this patent is extended or adjusted under 35 U.S.C. 154(b) by 370 days.

(21) Appl. No.: 15/126,243

(22) PCT Filed: Mar. 13, 2015

(86) PCT No.: PCT/GB2015/050749
§ 371 (c)(1),
(2) Date: Sep. 14, 2016

(87) PCT Pub. No.: WO2015/136310
PCT Pub. Date: Sep. 17, 2015

(65) Prior Publication Data
US 2017/0085393 A1    Mar. 23, 2017

(30) Foreign Application Priority Data
Mar. 14, 2014    (GB) .................................. 1404550.4

(51) Int. Cl.
*F24F 11/00*    (2018.01)
*H04L 12/28*    (2006.01)
(Continued)

(52) U.S. Cl.
CPC .......... *H04L 12/2818* (2013.01); *F24F 11/30* (2018.01); *F24F 11/62* (2018.01);
(Continued)

(58) Field of Classification Search
None
See application file for complete search history.

(56) References Cited

U.S. PATENT DOCUMENTS 7,155,305 B2 * 12/2006 Hayes .................... G05B 15/02
                                                                    700/224
7,379,778 B2 *  5/2008 Hayes .................... G05B 15/02
                                                                    340/10.1
(Continued)

FOREIGN PATENT DOCUMENTS

CN        103576664 A    2/2014

OTHER PUBLICATIONS

Search Report for corresponding Application No. GB1404550.4, dated Sep. 26, 2018.
Chinese Examination Report for corresponding Application No. 2015800227643, dated Oct. 8, 2018.

*Primary Examiner* — Van H Nguyen (57) ABSTRACT

A mobile communications device for controlling a thermal appliance is described. The device includes a first communications interface configured to communicate over a wireless local area network and a second communications interface configured to communicate over a wide area network. A processor is coupled to the communications interfaces and configured to send commands to control, and to receive information relating to, operation of the thermal appliance. A user interface for obtaining user input to control the thermal appliance and for providing information relating to operation of the thermal appliance is included. The processor is configured to: monitor connection of the first communication interface with the wireless local area network, determine whether to trigger an alert in response to loss of connection, and to send a command, based on user input provided in response to a triggered alert, to the thermal appliance via the second communications interface.

17 Claims, 9 Drawing Sheets

(51) Int. Cl.
*F24F 11/62* (2018.01)
*F24F 11/30* (2018.01)
*G05B 19/048* (2006.01)
*F24F 11/63* (2018.01)
*F24F 110/00* (2018.01)
*F24F 11/58* (2018.01)
*F24F 120/20* (2018.01)
*H04W 84/12* (2009.01)

(52) U.S. Cl.
CPC ........ *G05B 19/048* (2013.01); *H04L 12/2825* (2013.01); *H04L 12/2854* (2013.01); *F24F 11/58* (2018.01); *F24F 11/63* (2018.01); *F24F 2110/00* (2018.01); *F24F 2120/20* (2018.01); *G05B 2219/2614* (2013.01); *H04W 84/12* (2013.01)

(56) References Cited

U.S. PATENT DOCUMENTS

| | | | |
|---|---|---|---|
| 8,649,987 B2 * | 2/2014 | Steenberg | G05B 23/0235 |
| | | | 702/61 |
| 8,973,931 B2 | 3/2015 | Branger | |
| 9,234,668 B2 * | 1/2016 | Fadell | G05D 23/1902 |
| 2011/0231020 A1 * | 9/2011 | Ramachandran | G05D 23/1905 |
| | | | 700/278 |
| 2012/0286924 A1 | 11/2012 | Goto | |
| 2014/0031989 A1 | 1/2014 | Bergman et al. | |
| 2014/0031992 A1 | 1/2014 | Bergman et al. | |
| 2014/0045482 A1 | 2/2014 | Bisson et al. | |
| 2014/0059466 A1 | 2/2014 | Mairs et al. | |

\* cited by examiner

SYSTEM, METHOD, AND CONTROLLER FOR MONITORING AND CONTROLLING A THERMAL DEVICE WITH MOBILE COMMUNICATION DEVICE

The present disclosure relates to methods and apparatus for controlling the operation of thermal appliances, such as heating or cooling systems, for example systems such as may be used to heat or cool domestic or commercial premises.

Conventional heating and cooling systems may operate by a user manually switching the heating or cooling system off or on. For example, a user may manually turn a heating or cooling system on when desired depending on the ambient temperature of a room in a house. In some conventional heating and cooling systems a timer program may be used, so that for example the heating is scheduled to automatically turn on and off at set times in the day. However, it is common for such systems to be left on for longer than necessary. Therefore such conventional systems may be considered inefficient, and a more efficient heating or cooling system is desired. Wireless thermostats are one way to provide convenient control of thermal appliances.

Embodiments of the disclosure will now be described, by way of example only, with reference to the accompanying drawings, in which.

Embodiments of the disclosure relate to the control of thermal appliance for heating or cooling an area of a premises having a wireless local area network associated with that area.

Wireless mobile devices may use a local area network to control a thermal appliance, or to receive information about its operation—for example such as ambient temperature.

In one example of the disclosure a controller identifies wireless mobile wireless devices, such as telecommunications handsets that communicate with a wireless local area network, and monitors their connection to this network. In the event that the status of a connection changes, for example when a connection is lost, the controller can trigger an alert to control the thermal appliance.

In another example of the disclosure a mobile communications device is configured to monitor a connection of the mobile communications device to a wireless local area network, and to determine based on this monitoring whether to trigger an alert to control the thermal appliance. The wireless mobile device can then send a command to control the thermal appliance over a second, wider area network, which may be separate from the wireless local area network.

The decision as to whether to trigger this alert can be based, at least in part, on the number and/or identity of other mobile wireless devices that remain connected to the wireless local area network.

One such example will now be discussed with reference to FIG. 1A.

Figure 1A:
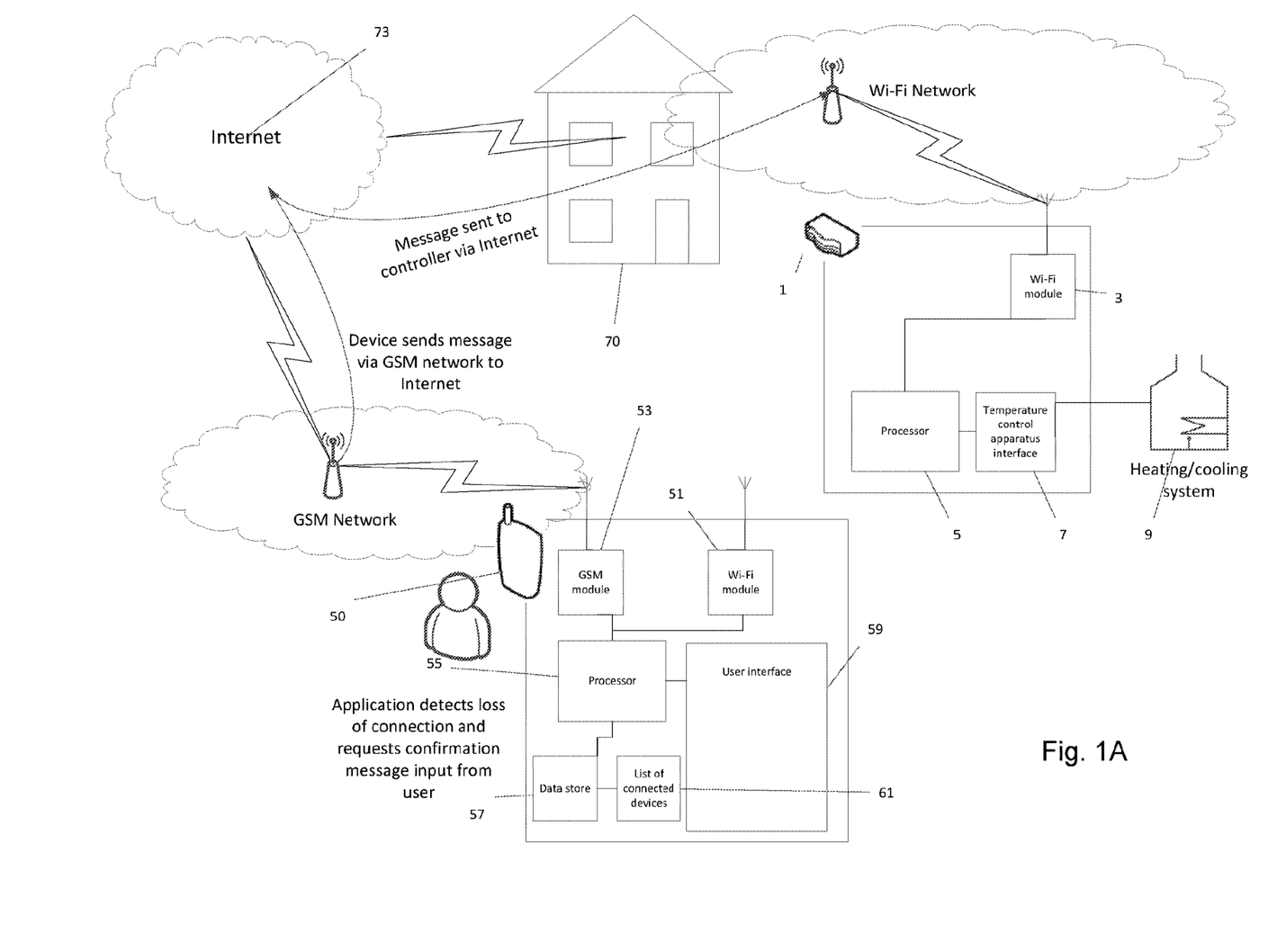
FIG. 1A shows a schematic diagram of a system for controlling the operation of a thermal appliance.

FIG. 1A illustrates a system for controlling the operation of a thermal appliance 9 for controlling the temperature of a premises 70.

The system comprises a controller 1 and a wireless local area network 71 associated with the premises 70, and a wireless mobile device to be carried by a user.

The wireless local area network 71 comprises a wireless access point and is coupled to a wide area network 73.

The controller 1 comprises a communications interface 3 coupled to a processor 5. The controller also comprises a thermal appliance interface 7. The processor of the controller is coupled to the thermal appliance interface 7.

The wireless mobile device includes a processor 55, coupled to a first communications interface 51 and a second communications interface 53. The wireless mobile device also comprises a data store 57 and a user interface 59, both of which are coupled to the processor 51.

The wireless mobile device and the controller are operable to communicate via the local area network. The controller 1 is operable to communicate with the thermal appliance 9 via the thermal appliance interface 7.

The wireless access point is configured to assign an identifier to each wireless mobile device communicating on the wireless local area network, and to provide wireless network communications to each of these mobile devices.

The controller is configured to control the thermal appliance 9, using the thermal appliance interface 7, based on commands received via the communications interface 3. The thermal appliance 9 is operable to increase or decrease the temperature in the premises 70 in response to received commands.

The wireless mobile device is operable to communicate via its first communication interface with the wireless local area network and to communicate via its second communications interface with the wide area network.

The user interface of the wireless mobile device is configured to provide an interface for controlling the thermal appliance, and the wireless mobile device is configured to transmit user commands from the user interface to the controller over the local area network. The wireless mobile device is further operable to transmit user commands to the controller via the wide area network. In this way, a user can control the thermal appliance 9 over the wireless local area network using their mobile device.

The processor of the wireless mobile device is configured to monitor the connection of the first communication interface to the wireless local area network, and to determine whether to trigger an alert in response to loss of this connection. The processor is also configured to send a message to the thermal appliance 9 via the wide area network, based on user input received in response to this alert.

The alert may comprise information relating to operation of the thermal appliance 9 and/or an identifier of a device, or the number of such devices, that remain connected to the local area network. For example "You have left, and nobody else is at home, and the heating is still on." The alert may prompt the user to provide a particular response "Do you want to turn the heating off?". The determination as to whether or not to trigger an alert may be based on the status of a wireless connection of at least one other wireless mobile device to the local area network. For example, "It looks like Aunty Kay is at home, would you like to adjust the heating for her?". One way to achieve this is for the mobile device to comprise a data store configured to store a plurality of unique identifiers each identifying a registered wireless mobile device, for example relating to a selected group of "registered" devices. The processor of the wireless mobile device may be configured to use the status of one or more of these devices to determine how to control the thermal appliance. To achieve this, the processor of the wireless mobile device may be configured to monitor the connection of one or more of these registered mobile devices to the wireless local area network. Where this is done, the processor is also configured to store, in the data store, an association between each registered device, and the status of its connection to the wireless local area network. Accordingly, the processor can be configured to obtain information as to the status of this connection and to update the corresponding association in the event that the device it identifies loses its wireless connection, or establishes a new wireless connection, with the wireless local area network.

Figure 1B:
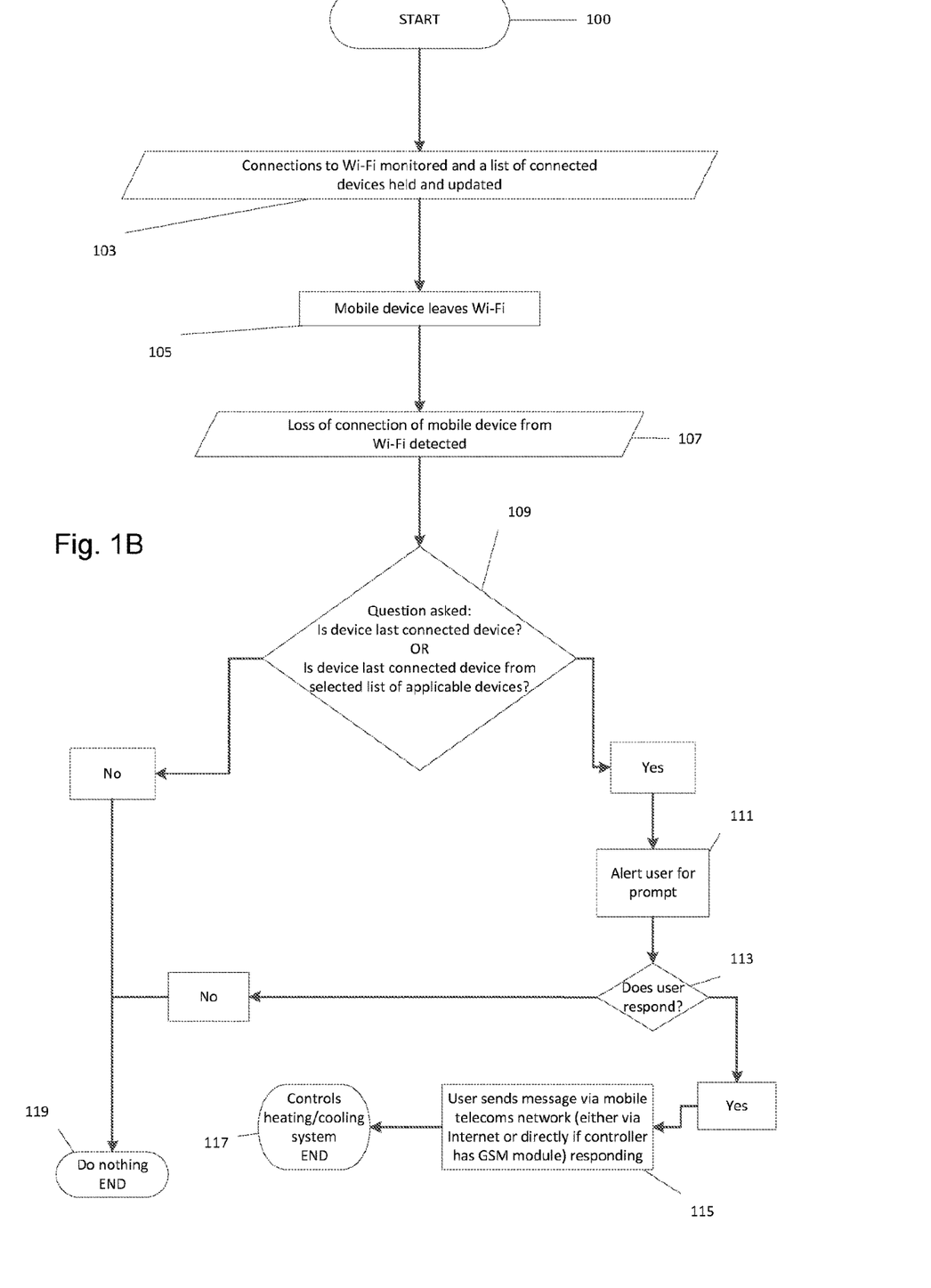
FIG. 1B shows an example flow diagram for a process for controlling the operation of a thermal appliance for use with the system of FIG. 1A or FIG. 2.

To assist in understanding the present disclosure, FIG. 1B shows a flow chart illustrating a method of operation, which can be applied in apparatus similar to that described above with reference to FIG. 1A, and in other apparatus.

As illustrated a wireless mobile device establishes a connection to the local area network to enable the wireless mobile device to send commands to control operation of a thermal appliance, and to receive information relating to operation of the thermal appliance. The wireless mobile device monitors 103 the status of this connection to the local area network, and triggers an alert in the event that the connection is lost.

For example, when the wireless mobile device leaves the range of the wireless local area network 71, in response to the connection with the wireless local area network being lost, the processor 61 can determine whether to trigger an alert 111 prompting the user of the wireless mobile device to control the thermal appliance. Based on user input provided in response to this triggered alert 111, the processor sends a command 115, via the wide area network, to control the thermal appliance.

If the message 115 is sent to control the thermal appliance 9 it may be received by the controller which controls the thermal appliance using its thermal appliance interface based on the content of the message. The thermal appliance interface may, of course, be a wired or wireless interface and may be provided via the local area network. If the user provides no input, the mobile device may be configured to send a default reply message to the controller 1.

As mentioned above, the wireless mobile device can be configured to monitor 103 connections to the local area network of other mobile devices, and to take these connections into account when determining 109 how to control the thermal appliance. In these examples, the processor can obtain an indication of the status of a connection of at least one other wireless mobile device to the local area network. At intervals (as explained above), this indication is updated. In the event that the wireless mobile device loses connection with the local area network, it is determined 109, based on the loss of its own connection and the indication of other devices connected to the network, whether to prompt the user carrying the wireless mobile device to send the command to control the thermal appliance.

Figure 2A:
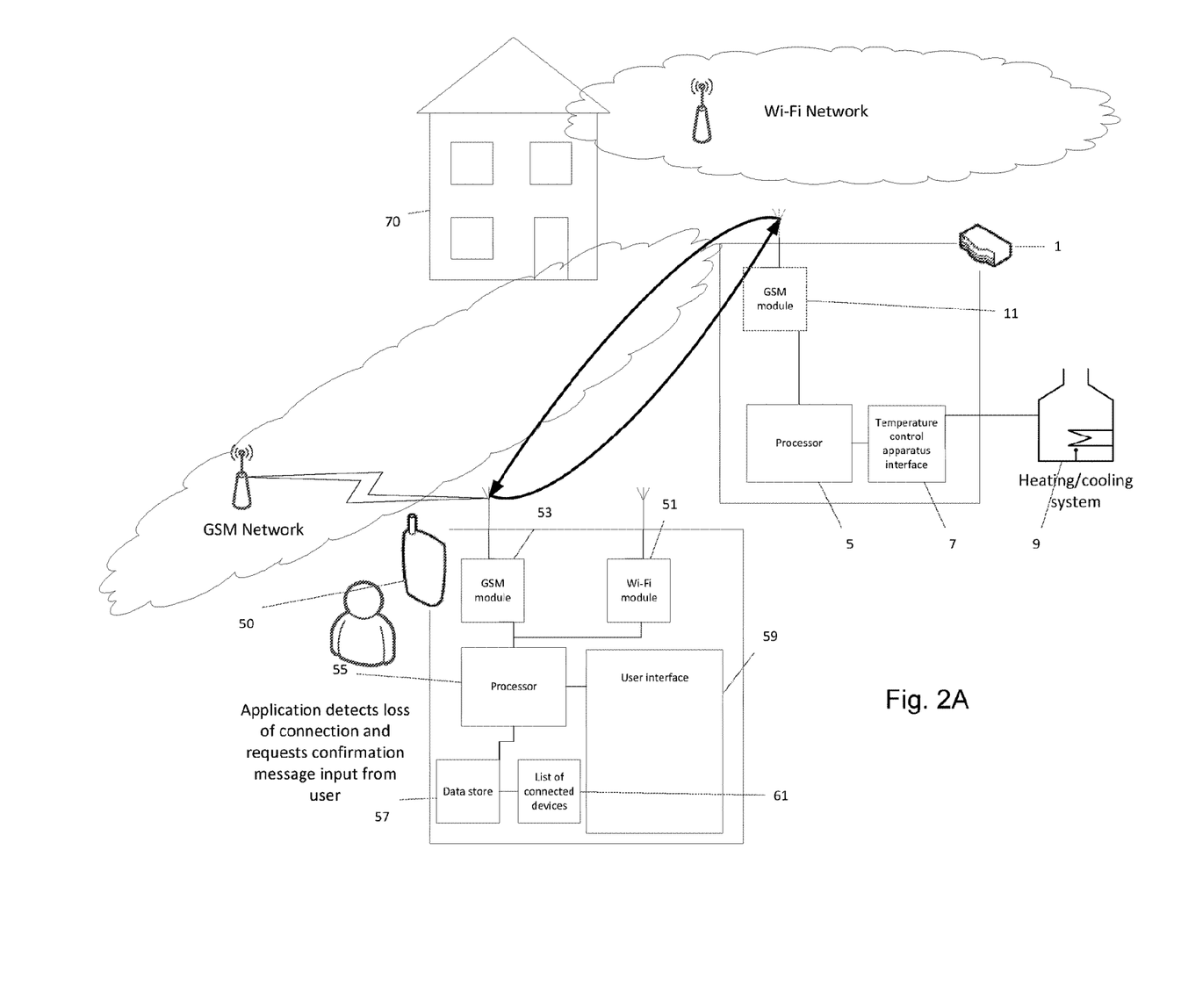
FIG. 2A shows a schematic diagram of a system for controlling the operation of a thermal appliance.
Figure 2B:
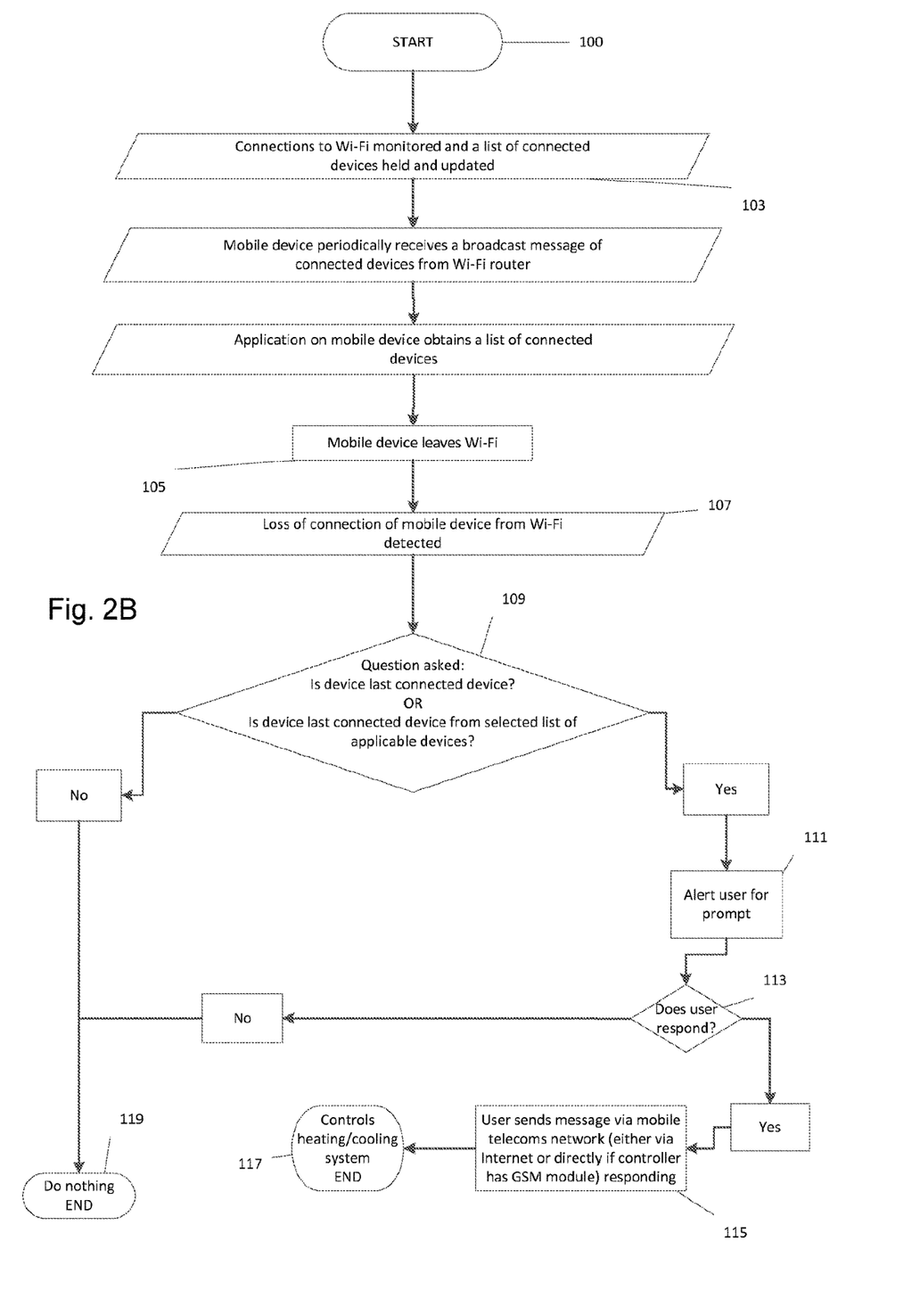
FIG. 2B shows an example flow diagram for a process for controlling the operation of a thermal appliance for use with the system of FIG. 1A or FIG. 2.

If it is determined 109 to prompt the user, the wireless mobile device displays information relating to the thermal appliance and/or the status of other monitored connections, and obtains input from the user. Based on this input, the wireless mobile device determines whether to send a message, via the wide area network to control the thermal appliance. As mentioned above, the other monitored connections may relate to a selected group of "registered" devices. Accordingly, the alert may be triggered on the condition that no other registered wireless mobile devices are connected to the wireless local area network at the time that the wireless mobile device's own connection is lost.

Where the status of other, e.g. registered, devices is to be taken into account, while it is connected to the local area network, as shown in FIG. 2B, the processor 55 obtains an identifier of at least one registered device that is wirelessly connected to the wireless network. The processor 55 stores an association 61 between this identifier, or identifiers, and the status of the connection of the device of devices they identify in the data store 57. Once this process has been completed the data store comprises an association between each identifier, and the status of the connection to the wireless network of the identified device. At intervals, the wireless mobile device communicates, via the wireless local area network, to update these association(s).

In these examples, the prompt can be based on these association(s), as explained above and can indicate the number and/or identities of other registered device(s) which remain connected to the wireless local area network. For example, the displayed message may be "You have left, and nobody else is at home, and the heating is still on. Do you want to turn the heating off?". As another example, the prompt may comprise information describing other devices which the associations indicate remain connected to the wireless local area network e.g. "Aunt Katy is at home alone, would you like to adjust the heating for her?".

Based on the user's input in response to this message, the mobile device 50 sends a message via the second communications interface 53 and the wide area network to the controller 1. The processor 5 of the controller 1 then controls the thermal appliance, via the control interface 7 based on this message. This enables the thermal appliance 9 to be controlled from the wireless mobile device 50.

The alert provided at the wireless mobile device 50 may comprise information relating to operation of the thermal appliance 9, such as for example whether it is on or off, or whether it is operating according to a particular timing program. This information may comprise a description of such a timing program, and/or temperature information obtained from a sensor of the thermal appliance and/or the controller 1, such as a thermostat. In these examples, the wireless mobile device may be configured to obtain this information from the controller 1 either via the local area network, or the wide area network.

The wireless mobile device 50 may be configured to monitor the connection of other devices to the network by obtaining information describing their connection status from at least one of: the controller 1; and the wireless access point of the local area network. To monitor the connection of other wireless mobile devices to the local area network, the wireless mobile device may be configured to send a request to the controller 1 to cause the controller to send back identifiers of other wireless mobile devices connected to the local area network. In another example the controller 1 may be configured to send these identifiers to the wireless mobile device at intervals. These intervals may be periodic, aperiodic, or timed in response to particular events such as other wireless mobile device(s) joining or leaving the local area network. Rather than sending identifiers at these intervals, the controller may be configured to send an indication of the number of other wireless mobile devices connected to the local area network. This indication may comprise the actual number of other wireless mobile devices connected to the local area network, or merely an indication that one or more other wireless mobile devices are connected. Accordingly, the association between the registered device, and the status of the connection stored in the data store may relate only to the wireless mobile device itself. In these examples, the data store indicates the existence of a connection between the wireless mobile device and the local area network and possibly also whether or not other wireless mobile devices are connected to the network. This association may be provided by a specifically allocated data store, or may be associated with the hardware of the wireless mobile device which maintains the connection (e.g. a WLAN interface).

A connection may be considered to be lost in the absence of communication for a time period greater than a time-out period specified by a protocol of the local area network.

The wide area network may comprise a telecommunications network, such as a 2G, 3G, 4G, or LTE network, a plain old telephone network, POTS, such as a public switched telephone network, PSTN, or any other kind of wide area communication network operable to communicate beyond the coverage area of the local area network. In some examples, the local area network may be decoupled from the internet, for example by a local router or firewall.

FIG. 2A shows an apparatus similar to that shown in FIG. 1A, but in which the local area network 71 is not in communication with the internet 73. In this configuration, the controller 1 has a wide area network interface 11 configured to communicate via a telecommunications network 75

In the configuration shown in FIG. 2A, when the wireless mobile device 50 leaves the range of the wireless local area network 71, in response to the connection with the wireless local area network being lost, the processor 61 can determine whether to trigger an alert prompting the user of the wireless mobile device 50 to control the thermal appliance 9. Based on user input provided in response to this triggered alert, the processor 55 sends a command 115, via the telecommunications network to the controller 1, so that the controller 1 can control the thermal appliance 9 based on this message.

Accordingly, the message can be sent direct to the controller 1 from the second communications interface 53 of the mobile device 50. This may provide a system which is more straightforward to install because it does not require communication channels to be opened between the local area network and the internet. Security measures such as firewalls can therefore be unaffected.

There are a variety of different ways in which the mobile device 50 can identify and monitor connection of devices the wireless local area network 71. For example, a wireless access point of the local area network 71 can monitor the status of these connections and broadcast a message providing this status information to wireless mobile devices connected to the wireless access point 71. The controller 1, may also be configured to perform this function. Typically, these broadcast messages will comprise unique identifiers of devices connected to the wireless local area network, and the status of their connections.

The controller may comprise a device that is coupled, wirelessly or by a wired connection to the wireless access point or to the local area network, for example via an Ethernet connection or an IEEE802.11 wireless connection to the wireless access point 71. The functionality of the controller 1 may be distributed between one or more network devices. For example the communications interface of the controller may comprise a wired coupling to the wireless access point which may provide wireless communication for the controller 1.

In some configurations, the processor 55 of the mobile device 50 is configured to send messages over the local area network to request this status information. The request may be sent to a wireless access point of the local area network, or to other mobile devices connected to the local area network to identify those devices by obtaining their unique identifiers and the status of the associated connection.

The processor 55 of the mobile device may also be configured to identify devices connected to the wireless local area network by obtaining the identifiers and connection status information via the wide area network. For example the information can be requested and/or sent to the wireless mobile device from the controller 1, or a wireless access point 71 of the local area network using a message sent via the wide area network. This may be done even when the mobile device 50 is not connected to the local area network 71.

It will be clear from the discussion above, that the monitoring of a selected group, or family, of devices is optional. In the processor 55 may simply trigger an alert and prompt the user when a wireless connection between the mobile device 50 and the local area network 71 is lost.

A variety of different message types can be used to communicate over the wide area network. Examples of such messages include SMS messages, and MMS messages which may be forwarded at least partially over a mobile telecommunications network to the controller 1. Other types of wide area network messages comprise email messages and other kinds of packet switched communication.

In some configurations, the mobile device 50 may be configured to communicate directly with the thermal appliance 9. In such configurations, instead of sending a message to the controller 1 the mobile device 50 may send a control signal over the wide area network, and/or the local area network directly to the thermal appliance 9.

Figure 3A:
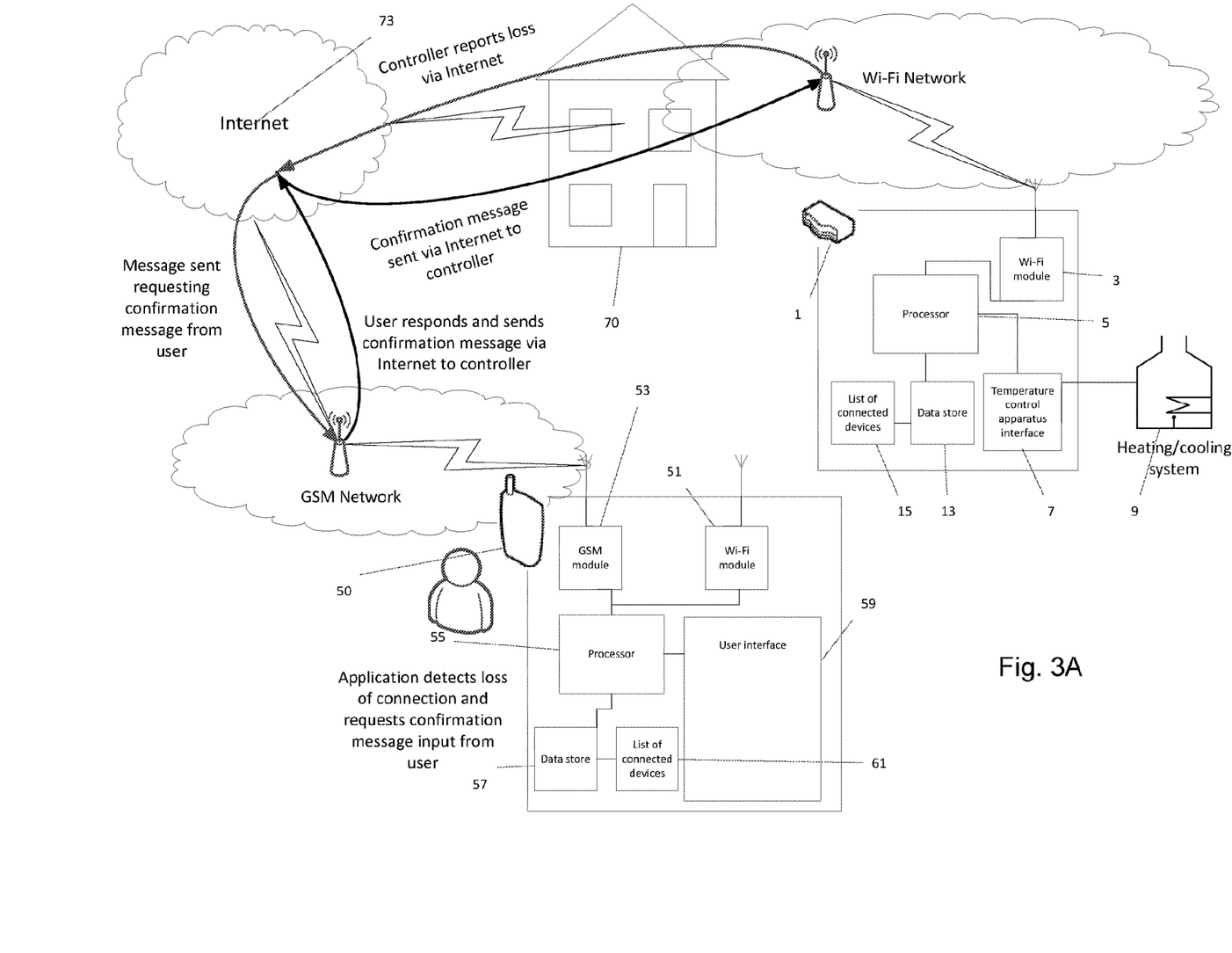
FIG. 3A shows a schematic diagram of a system for controlling the operation of a thermal appliance.
Figure 3B:
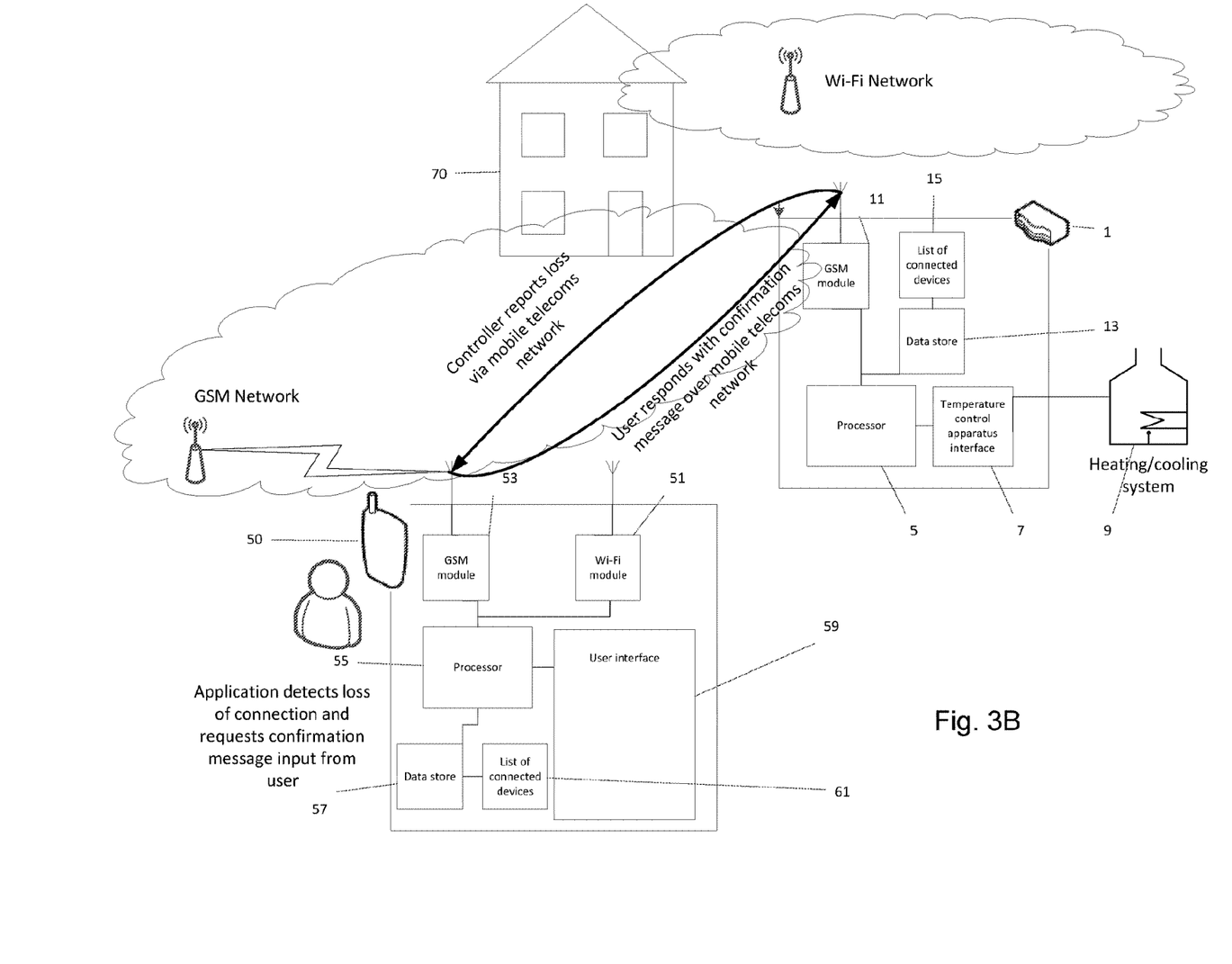
FIG. 3B shows a schematic diagram of a system for controlling the operation of a thermal appliance.

In the context of the present disclosure, it will be appreciated that the mobile device 50 need not perform the connection monitoring function itself. FIGS. 3A and 3B illustrate two examples of the disclosure in which a controller 1 is coupled to the local area network to perform this function and to control the thermal appliance 9. Operation of this apparatus is illustrated in the flow diagram shown in FIG. 3C.

FIG. 3A shows a system for controlling the temperature of an area of a building. The system illustrated in FIG. 3A comprises a thermal appliance 9, for heating or cooling the area, and a controller 1 for controlling the thermal appliance. The system also comprises a wireless local area network that provides wireless communication in the area to be heated.

The controller 1 comprises a first communication interface 3, a data store 13, and a processor 5 coupled to the data store 13 and to the first communications interface 3. The controller 1 also comprises a thermal appliance interface 7 that couples the processor 5 to the thermal appliance 9.

The thermal appliance interface 7 is arranged to enable the processor 5 to send commands to the thermal appliance 9 and to receive information describing the operation of the thermal appliance. The first communication interface 3 is configured to communicate between the processor 5 and the local area network.

The processor 5 is configured to communicate over the local area network, and is operable to identify wireless mobile devices connected to the network. The processor 5 is also configured to monitor the status of the connection between identified wireless mobile devices and the local area network.

Figure 3C:
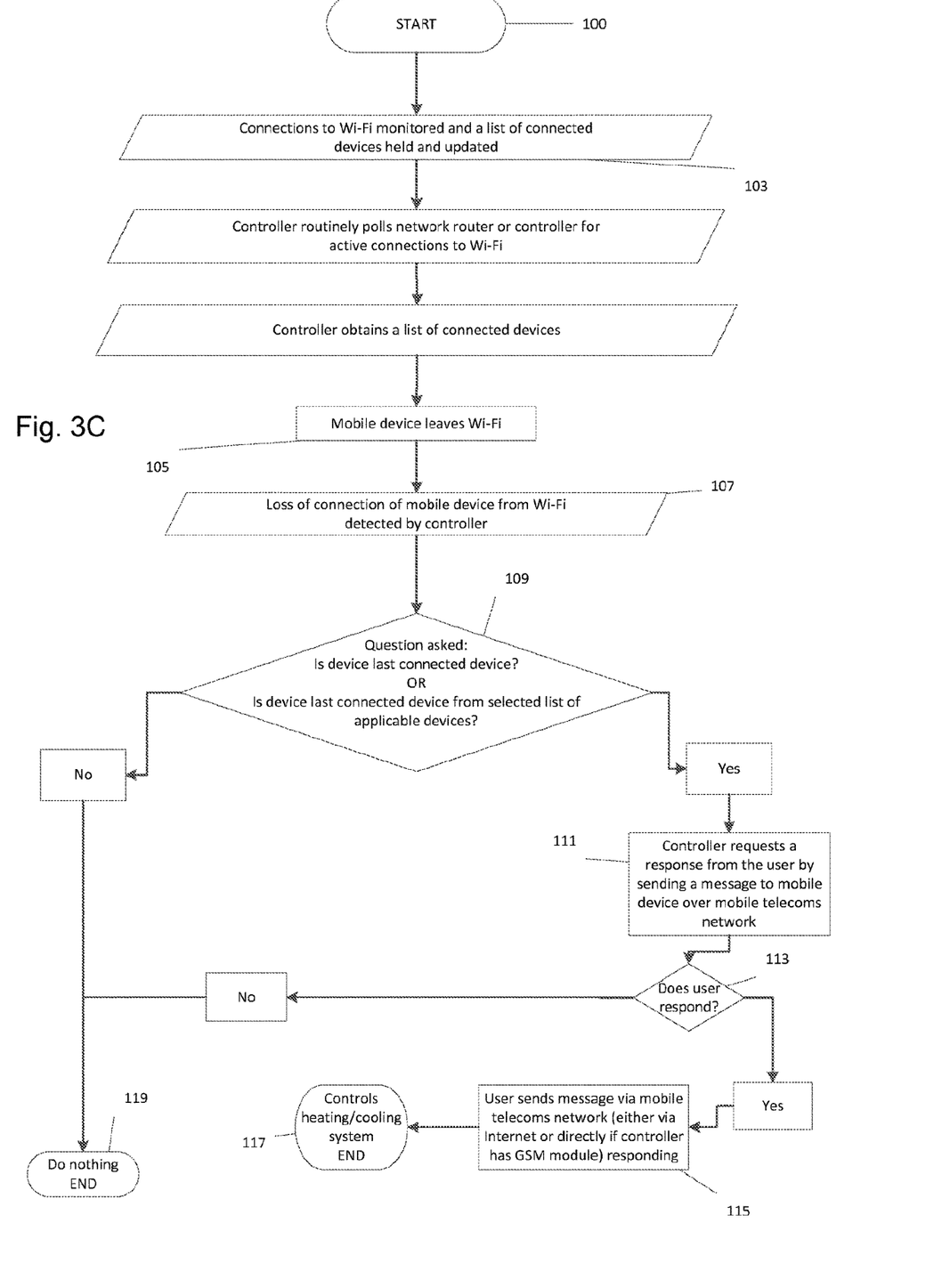
FIG. 3C shows an example flow diagram for a process for controlling the operation of a thermal appliance for use with the system of FIG. 3A or FIG. 3B.

In operation as illustrated by FIG. 3C, the controller 1 obtains a unique identifier of the mobile device 50, and stores an association 15 between the unique identifier and the status of the corresponding device's connection to the wireless local area network in the data store 13. The processor 5 of the controller 1 monitors 103 the status of this connection by obtaining the information at intervals to update the stored associations.

In the event that the connection status changes 107, the processor 5 updates the corresponding stored association 15. In response to this change in status, the processor 5 determines 109 how to control the thermal appliance 9, and sends a message to the thermal appliance 9 to control its operation based on this determination.

This determination may take a variety of factors into account, and may be achieved in a variety of different ways. For example, the data store 13 of the controller 1 may store a plurality of identifiers that identify a selected group of registered wireless mobile devices. In these examples, the controller 1 can store associations between these identifiers and the status of the corresponding connection to the local area network. Accordingly, the processor 5 of the controller 1 can be configured to monitor the status of the connection of one or more of these registered devices to the local area network. The controller 1 can then determine whether any of the selected group remain connected to the wireless local area network and control the thermal appliance 9 based on this determination.

The controller 1 may comprise a second communications interface 11 configured to communicate via a wide area communications network for communicating over a wider area than the local area network, as shown in FIG. 3B. Where this is present, the processor 5 may be configured to respond to a change in status of a monitored connection to the local area network by sending a message to one or more wireless mobile devices via the wide area communications network. The controller 1 can then control the thermal appliance 9 based on the response to this first message.

The processor 5 may be configured to include, in this first message, information relating to operation of the thermal appliance 9, such as for example whether it is on or off, or whether it is operating according to a particular timing program. This information may comprise a description of such a timing program, and/or temperature information obtained from a sensor of the thermal appliance and/or the controller 1, such as a thermostat.

The processor 5 may also be configured to send information based on the connection status of at least one of the selected group of registered devices in this first message.

A wireless mobile device 50 to which this first message is sent may respond by prompting a user for a command 111. The prompt may include one or more pieces of information obtained from this first message. Based on the user's command in response to this prompt a second message may be sent 115 back to the controller from the wireless mobile device. This second message may be sent via the wide area communication network.

In the event that no such response is received the processor is configured to apply a default control to the thermal appliance.

The controller 1 may obtain the connection status information by sending a request message over the wireless area network. This message may be sent to a wireless access point of the local area network, and may be configured to cause the wireless access point to respond with a list of wireless mobile devices which are wirelessly connected to that access point. In some possibilities, the this request message may be broadcast to wireless mobile devices that are connected to the network and may be configured to cause the wireless mobile devices to respond to the controller if they are connected to the local area network. In this way, the controller can determine which devices are connected to the local area network.

The function of monitoring connections to the local area network, and triggering alerts on user carried devices has been described above as being localised to a particular device, which may be provided in a user carried device (such as the mobile device described with reference to FIG. 1A or FIG. 2A), or which may be provided in a network device such as the controller described with reference to FIG. 3A or FIG. 3B. It will be appreciated that some or all of this function may be spread between different hardware elements, for example in the manner of a distributed system. In addition, in some configurations the monitoring and control functionality is performed by a remote device 85, such as a webserver, which may be coupled to the premises by a wide area network.

Figure 4A:
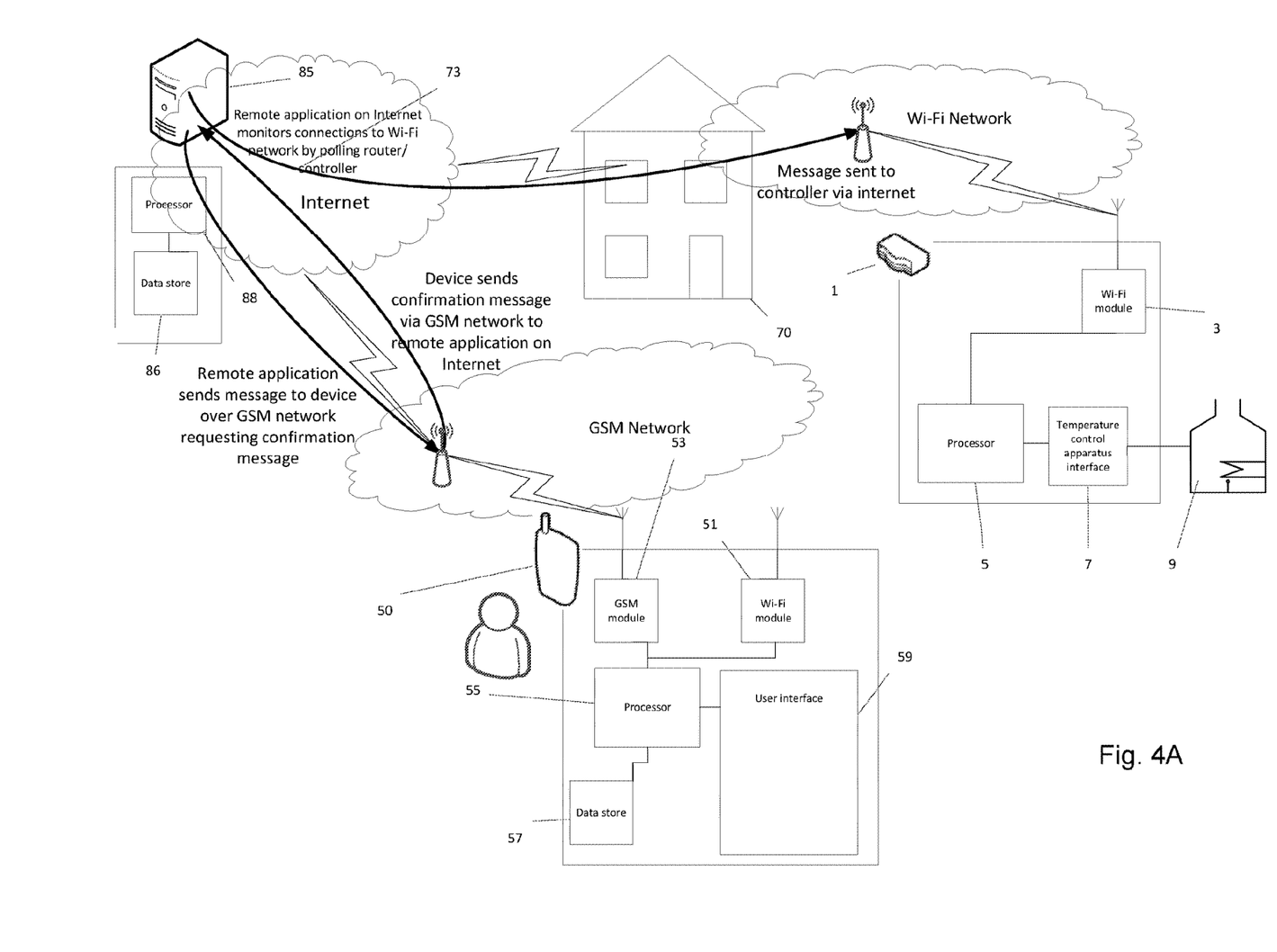
FIG. 4A shows a schematic diagram of a system for controlling the operation of a thermal appliance.
Figure 4B:
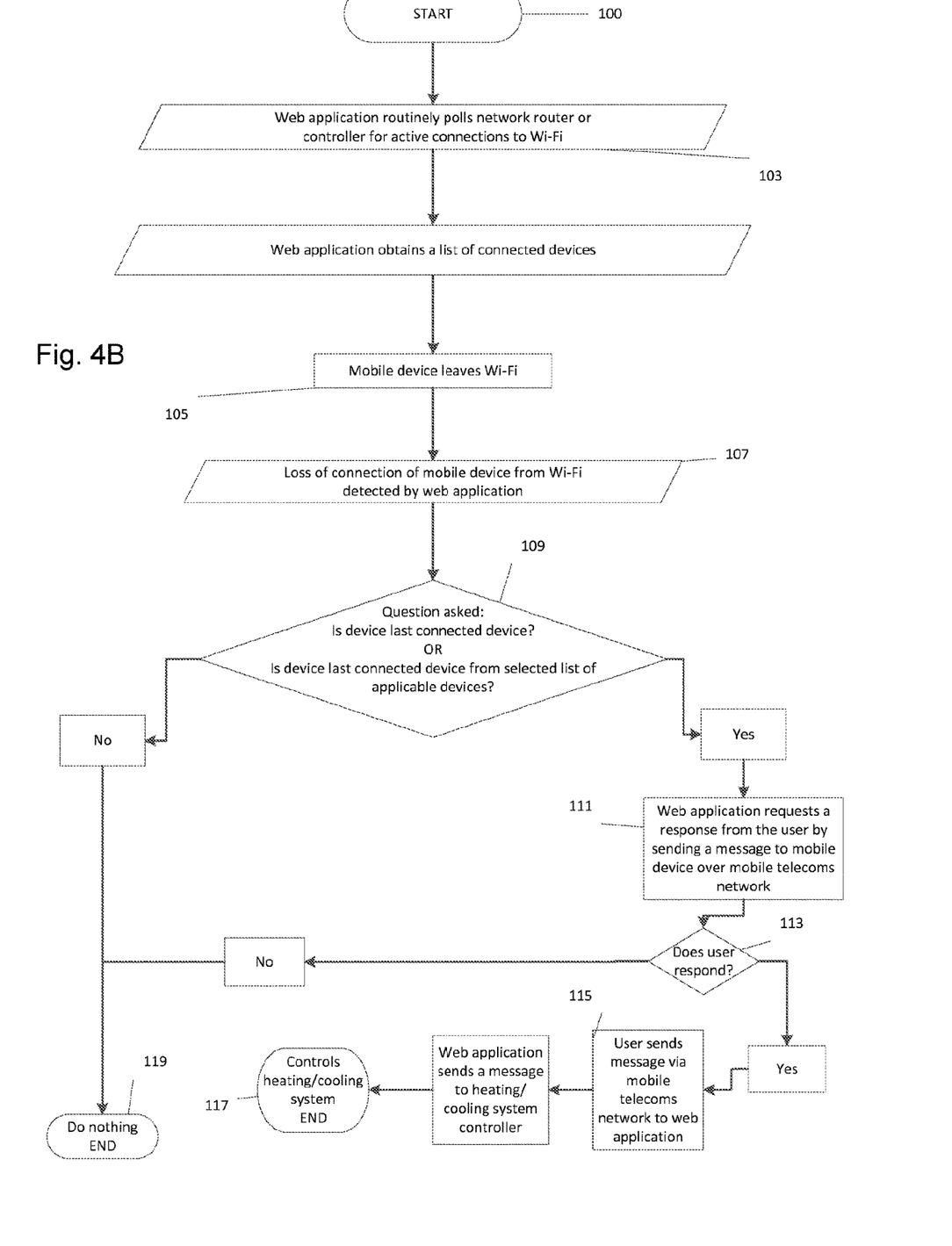
FIG. 4B shows an example flow diagram for a process for controlling the operation of a thermal appliance for use with the system of FIG. 4A.

FIG. 4A illustrates one example of such a system, a method of operation of this system is illustrated in the flow diagram shown in FIG. 4B.

The apparatus shown in FIG. 4A comprises a thermal appliance 9 and a controller 1 coupled to a local area network 71 at a premises. A remote device 85 is coupled to communicate with the local area network via a wide area network 73.

The apparatus shown in FIG. 4A also comprises a wireless mobile device 50 which can be carried by a user.

The remote device comprises a data store 86 and a processor 88. The processor 88 is coupled to the data store, and is also coupled to communicate over the wide area network via a communications interface.

The controller 1 comprises a communications interface 3 coupled to a processor 5. The controller 1 also comprises a thermal appliance interface 7 coupled to the processor 5.

The wireless mobile device includes a processor 55, coupled to a first communications interface 51 and to a second communications interface 53. The wireless mobile device also comprises a data store 57 and a user interface 59, both of which are coupled to the processor 51.

The wireless mobile device and the controller 1 are operable to communicate with the remote device via the wide area network, and to communicate with the local area network. The controller 1 is operable to communicate with the thermal appliance via the thermal appliance interface 7.

The processor 88 of the remote device 85 is configured identify wireless mobile devices connected to the wireless local area network 71.

The processor 88 of the remote device is configured to communicate with the local area network to obtain a unique identifier of at least one wireless mobile device connected to the local area network 71, and to store, in the data store 86, an association between the at least unique identifier and the status of a corresponding connection to the network. The processor 88 is also configured to communicate with the local area network at intervals to update these associations so as to monitor these wireless connections.

In operation, in the event that the processor 88 of the remote server 85 detects the loss of a connection between a wireless mobile device and the local area network 71, the processor 88 determines, based on the stored associations describing the connections to the local area network, whether to trigger an alert on a wireless mobile device, and/or to send a command to the controller 1 to control the thermal appliance.

As described above with reference to FIG. 1A and FIG. 2A, the data store of the controller may store a plurality of unique identifiers identifying a selected group of "registered" devices. In the event that the processor 88 determines that none of the registered devices has an active connection with the local area network 71, then the processor 88 of the remote server 85 sends a message to the mobile device 50 via the wide area network to prompt the user for a command to control the thermal appliance. This command may be sent back to the controller via the remote device 85, or over the wide area network to the local area network or to the controller 1.

As for the mobile device 50 and the controller 1 described above, in some configurations, the processor 88 of the remote server 85 may simply send a message to trigger an alert on the mobile device 50 in the event that a connection between any mobile device 50 and the wireless local area network 71 is lost.

As will be appreciated by the skilled addressee in the context of the present disclosure, the example system described with reference to the drawings above is merely exemplary, and many variations, alternatives and further refinements of the features described may be applied. For example, the wide area network may comprise at least one of a telecommunications network, such a 2G, 3G, 4G, or LTE network, and an IP based network coupled to the internet.

In some situations a wireless local area network may not be coupled to the internet, or may be at least partially protected from it by a router, which may comprise a firewall or other network security measures. In these examples the controller may comprise an interface to a wide area network via a telecommunications network such as a cellular network, a POTS (plain old telephone system).

The processor may be configured to determine how to control the heating or cooling appliance based on the connection status of the wireless mobile device and the absence of a connection to at least one other wireless mobile device. The wireless mobile devices that are considered in these determinations may be restricted to those devices identified as "registered" devices.

The functionality of the controller may be provided by a device arranged locally in the area to be heated, for example on the premises. In another example all or part of the functionality of the controller may be provided by a remote device, which may be coupled to control the thermal appliance via a wide area communication network such as the internet.

The processor of the controller 1, and/or the processor of the wireless mobile devices described herein may comprise a general purpose processor, which may be configured to perform a method according to any one of those described herein. In some examples the controller may comprise digital logic, such as field programmable gate arrays, FPGA, application specific integrated circuits, ASIC, a digital signal processor, DSP, or any other appropriate hardware.

Where configuration of a processor, or other programmable component, is described this may be achieved by procedural or object oriented programming, or by the use of scripting which incorporates a mixture of both procedural and object oriented approaches. In some cases FGPAs or ASICs may be used to provide these configurations.

The data stores described herein may be provided by volatile or involatile memory storage such as RAM, EEPROM, FLASH memory, or any other form of computer readable media.

The user interfaces of the wireless mobile devices may comprise human input devices such as pointing devices, touch screens, keyboards and voice recognition input systems. The user interfaces may also comprise audio and visual output, which may be graphical and/or text based.

It is suggested that any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

In some configurations the prompt may be raised on a device other than the device 50 causing the change in the status of the connection. For example, the prompt may be raised on a "master" device when a "child" device loses connection with the wireless access point 71. Both the "master" and the "child" device may have a unique identifier corresponding to a unique identifier from a selected list of registered unique identifiers.

In some configurations, the thermal appliance 9 may be a central thermal appliance 9, and may comprise for example a boiler. The thermal appliance 9 may comprise other components, such as a wireless thermostat, or the controller 1 may comprise a thermostat. The thermal appliance 9 may further comprise a hub that couples to the wireless access point 71 to provide a communication channel between the controller 1, the hub and optionally the thermostat.

The thermal appliance 9 may comprise an electric heating system 9, for example an electric heater. The thermal appliance 9 may comprise a water heater, for example a hot water tank coupled to a boiler, or an immersion heater. Information relating to the operation of the appliance may comprises the level and/or temperature of hot water in a hot water tank. It will be appreciated that although a thermal appliance 9 has been described, the present disclosure could equally apply to a cooling system, for example a fan or to a climate control system, for example an air conditioning system.

In some configurations, the process may be configured to turn the heating on. For example, the controller 1, the mobile device 50 or the remote server 85 may determine that the status indicator of an identified device indicates that someone has returned to the premises 70. In such circumstances, the controller 1, the mobile device 50 or the remote device 85 may determine whether a registered device has connected to the local area network 71, and based on the result of the determination may send a message over the wide area network and/or the local area network to turn the heating system 9 on, and/or may cause a prompt to be displayed to the user at the mobile device asking the user whether they wish to turn the heating back on.

It is suggested that any feature of any one of the examples disclosed herein may be combined with any selected features of any of the other examples described herein. For example, features of methods may be implemented in suitably configured hardware, and the configuration of the specific hardware described herein may be employed in methods implemented using other hardware. In the context of the present disclosure, it will be appreciated that other examples and variations of the apparatus and methods described herein may be provided within the scope of the appended claims.

The invention claimed is:

1. A mobile communications device for controlling a thermal appliance, the device comprising:
   a first communications interface configured to communicate over a wireless local area network;
   a second communications interface configured to communicate over a wide area network;
   a processor coupled to the communications interfaces and configured to send, via the local area network, commands to control operation of the thermal appliance, and to receive, via the local area network, information relating to operation of the thermal appliance;
   a user interface for obtaining user input to control the thermal appliance and for providing a user with information relating to operation of the thermal appliance; and
   a data store configured to store a plurality of unique identifiers each identifying a registered wireless mobile device;
   wherein the processor is further configured to:
      monitor a connection of the first communication interface with the wireless local area network,
      determine whether to trigger an alert prompting a user of the mobile communications device to control the thermal appliance in response to a loss of connection of the first communication interface to the wireless local area network, wherein the determination is based on a status of a wireless connection of at least one other wireless mobile device to the local area network, wherein the determination is further based on the number of other registered mobile devices wirelessly connected to the local area network at the time the connection is lost; and
      to send a command, based on a user input provided in response to a triggered alert, to the thermal appliance via the second communications interface; and
      wherein the alert is triggered on the condition that no other registered wireless mobile devices are connected to the wireless local area network.

2. The mobile device of claim 1 wherein the alert comprises information relating to operation of the thermal appliance.

3. The mobile device of claim 1 wherein the alert comprises information relating to other registered wireless mobile devices that are connected to the wireless local area network.

4. The mobile device of claim 1 wherein monitoring comprises obtaining information describing a connection status of other wireless mobile devices connected to the local area network from at least one of: a controller coupled to the thermal appliance; and a wireless access point of the local area network.

5. The mobile device of claim 4 wherein obtaining the information comprises one of: (i) receiving a message from at least one of: a controller coupled to the thermal appliance; and a wireless access point of the local area network, and (ii) sending a request to at least one of: a controller coupled to the thermal appliance; and a wireless access point of the local area network.

6. A process comprising:
   obtaining, via a user interface of a wireless mobile device, commands to control a thermal appliance;
   storing a plurality of unique identifiers each identifying a registered wireless mobile device,
   sending from the wireless mobile device, via a local area network, a command to control operation of the thermal appliance,
   receiving at the wireless mobile device, via the local area network, information relating to operation of the thermal appliance;
   monitoring the status of a wireless connection of the wireless mobile device to the local area network;
   triggering an alert prompting a user of the wireless mobile device to control the thermal appliance at the wireless mobile device in response to a loss of connection with the local area network,
   sending a command, based on a user's response to the alert, to control the thermal appliance via a wide area network;
   determining whether to trigger the alert based on the status of a wireless connection of at least one other wireless mobile device to the local area network, wherein the determination is based on the number of other registered mobile devices wirelessly connected to the local area network at the time the connection is lost; and
   wherein the alert is triggered on the condition that no other registered wireless mobile devices are connected to the wireless local area network at the time the connection is lost.

7. The process of claim 6 wherein the alert comprises information relating to operation of the thermal appliance.

8. The process of claim 6 wherein the alert comprises information relating to other registered wireless mobile devices that are connected to the wireless local area network at the time the connection is lost.

9. The process of claim 6 comprising obtaining information describing the connection status of other wireless mobile devices connected to the local area network from at least one of: a controller coupled to the thermal appliance; and a wireless access point of the local area network.

10. The process of claim 9 wherein obtaining the information comprises one of: (i) receiving a message from at least one of: a controller coupled to the thermal appliance; and a wireless access point of the local area network, or (ii) sending a request to at least one of: a controller coupled to the thermal appliance; and a wireless access point of the local area network.

11. The process of claim 6 wherein controlling the appliance via the wide area network comprises sending a message over the wide area network to a controller coupled to the local area network and configured to control the thermal appliance based on the message.

12. A computer program product or products, comprising a non-transitory computer readable medium and program instructions stored on the non-transitory computer readable medium, the program instructions executed by a processor to perform a process comprising the steps of:
   obtaining, via a user interface of a wireless mobile device, commands to control a thermal appliance;
   storing a plurality of unique identifiers each identifying a registered wireless mobile device,
   sending from the wireless mobile device, via a local area network, a command to control operation of the thermal appliance,
   receiving at the wireless mobile device, via the local area network, information relating to operation of the thermal appliance;

monitoring the status of a wireless connection of the wireless mobile device to the local area network;

triggering an alert prompting a user of the wireless mobile device to control the thermal appliance at the wireless mobile device in response to a loss of connection with the local area network, sending a command, based on a user's response to the alert, to control the thermal appliance via a wide area network;

determining whether to trigger the alert based on the status of a wireless connection of at least one other wireless mobile device to the local area network, wherein the determination is based on the number of other registered mobile devices wirelessly connected to the local area network at the time the connection is lost; and wherein the alert is triggered on the condition that no other registered wireless mobile devices are connected to the wireless local area network at the time the connection is lost.

13. The computer program product of claim 12 wherein the alert comprises information relating to operation of the thermal appliance.

14. The computer program product of claim 12 wherein the alert comprises information relating to other registered wireless mobile devices that are connected to the wireless local area network at the time the connection is lost.

15. The computer program product of claim 12 comprising obtaining information describing the connection status of other wireless mobile devices connected to the local area network from at least one of: a controller coupled to the thermal appliance; and a wireless access point of the local area network.

16. The computer program product of claim 15 wherein obtaining the information comprises one of: (i) receiving a message from at least one of: a controller coupled to the thermal appliance; and a wireless access point of the local area network, or (ii) sending a request to at least one of: a controller coupled to the thermal appliance; and a wireless access point of the local area network.

17. The computer program product of claim 12 wherein controlling the appliance via the wide area network comprises sending a message over the wide area network to a controller coupled to the local area network and configured to control the thermal appliance based on the message.

* * * * *